(12) United States Patent
Kuramashi et al.

(10) Patent No.: US 10,385,756 B2
(45) Date of Patent: Aug. 20, 2019

(54) EXHAUST DEVICE OF ENGINE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 25 days.

(21) Appl. No.: 15/905,410

(22) Filed: Feb. 26, 2018

(65) Prior Publication Data

US 2018/0258826 A1    Sep. 13, 2018

(30) Foreign Application Priority Data

Mar. 10, 2017  (JP) ................... 2017-045690
Nov. 22, 2017  (JP) ................... 2017-224923

(51) Int. Cl.
| | |
|---|---|
| *F01N 13/10* | (2010.01) |
| *F01N 13/00* | (2010.01) |
| *F01N 3/10* | (2006.01) |
| *F02B 75/20* | (2006.01) |

(52) U.S. Cl.
CPC ............ *F01N 13/10* (2013.01); *F01N 3/10* (2013.01); *F01N 13/008* (2013.01); *F01N 2470/18* (2013.01); *F01N 2490/00* (2013.01); *F01N 2560/025* (2013.01); *F02B 75/20* (2013.01); *Y02A 50/2324* (2018.01)

(58) Field of Classification Search
CPC combination set(s) only.
See application file for complete search history.

(56) References Cited

U.S. PATENT DOCUMENTS

| | | | |
|---|---|---|---|
| 7,490,465 B2 * | 2/2009 | Weimert | F01N 13/18 180/296 |
| 8,713,920 B2 * | 5/2014 | Bruck | F01N 13/1805 60/299 |
| 9,611,777 B2 * | 4/2017 | Kato | F01N 3/2066 |
| 10,280,825 B2 * | 5/2019 | Kuramashi | F01N 13/10 |
| 2016/0017778 A1 * | 1/2016 | Sandou | A01D 41/12 60/297 |
| 2017/0009638 A1 * | 1/2017 | Suetou | F01N 3/2066 |

FOREIGN PATENT DOCUMENTS

JP    S64-039418 U    3/1989

* cited by examiner

*Primary Examiner* — Binh Q Tran
(74) *Attorney, Agent, or Firm* — Studebaker & Brackett PC

(57) ABSTRACT

An arc-shaped recess part is provided at a collective pipe of an exhaust manifold, whereby a flow of exhaust gas from one end side of cylinders is uniformized and then introduced into an exhaust-gas purifying device.

8 Claims, 11 Drawing Sheets

EXHAUST DEVICE OF ENGINE

BACKGROUND OF THE INVENTION

The present invention relates to an exhaust device of an engine.

Conventionally, a catalyst for purifying exhaust gas is provided at an upstream side of an exhaust path of an automotive-vehicle engine, such as a diesel engine or a gasoline engine.

For example, in an in-line multi-cylinder engine, an exhaust manifold which comprises plural independent pipes connected to respective exhaust ports and a collective portion of the independent exhaust pipes is connected between the exhaust ports and a catalyst so as to collect exhaust gas from plural cylinders and introduce the collected exhaust gas into the catalyst (see Japanese Utility-Model Laid-Open Publication No. S64-39418, for example).

Herein, in a case where a layout where the exhaust gas flows from one end side of cylinders toward a catalyst converter is adopted as described in the above-described patent document, a line of an exhaust-gas flow from the one end side of the cylinders and a line of an exhaust-gas flow from the other cylinders becomes so different that there is a concern that contacting of the exhaust gas with the catalyst may not be uniform improperly.

SUMMARY OF THE INVENTION

Accordingly, an object of the present invention is to provide an exhaust device of an engine which can improve uniformization of contacting of the exhaust gas with an exhaust-gas purifying device even in a case where the exhaust manifold to guide the exhaust gas from one end side of cylinders toward the exhaust-gas purifying device positioned downward is adopted.

The present invention is an exhaust device of an engine which comprises an exhaust manifold connected to plural exhaust ports of an in-line multi-cylinder engine comprising an engine body provided with plural cylinders, an exhaust-gas purifying device connected to a downstream side, in an exhaust-gas flowing direction, of the exhaust manifold, wherein the exhaust manifold comprises plural independent exhaust pipes which are connected to the plural exhaust ports of the engine body, a collective pipe which is provided on one end side, in a cylinder row direction, of the engine body and extends downward from a tip portion of one of the plural independent exhaust pipes which is positioned on the one end side in the cylinder row direction, a guide pipe which extends in the cylinder row direction so as to introduce exhaust gas flowing down through the rest of the plural independent exhaust pipes toward the one of the plural independent exhaust pipes and guide the exhaust gas to the collective pipe, an L-shaped bent part which is provided at a lower portion of the collective pipe and configured to be bent in an L shape in a lateral direction such that the exhaust gas is directed toward an upstream-side end face of the exhaust-gas purifying device, and an arc-shaped recess part which is provided on a lower-face side of the L-shaped bent part of the collective pipe and configured to have a larger radius than an outlet of the L-shaped bent part which opens toward the exhaust-gas purifying device so as to promote a swirl of the exhaust gas such that the exhaust gas flowing down through the collective pipe along a wall face which is configured to be continuous downward from a tip side of the one of the plural independent exhaust pipes of the collective pipe flows into the exhaust-gas purifying device, swirling around an axial center of the exhaust-gas purifying device.

According to the present invention, the exhaust gas flowing out of the exhaust port of the one of the plural independent exhaust pipes which is positioned on the one end side in the cylinder row direction flows into the collective pipe through the above-described one of the plural independent exhaust pipes directly. This collective pipe extends downward from the tip portion of the above-described one of the plural independent exhaust pipes. Accordingly, the exhaust gas flows down along the wall face continuous from the tip side of the above-described one of the plural independent exhaust pipes of the collective pipe and reaches the L-shaped bent part mainly because of the inertia of the exhaust gas flowing toward the tip portion of the above-described one of the plural independent exhaust pipes. The arc-shaped recess part configured to have the larger radius than the outlet of the L-shaped bent part is provided on the lower-face side of the L-shaped bent part. Accordingly, the exhaust gas flowing down along the wall face continuous from the tip side of the one of the plural independent exhaust pipes of the collective pipe goes upward along a recessed bottom wall face of the arc-shaped recess part because of the inertia and flows into the exhaust-gas purifying device, swirling around the axial center of the exhaust-gas purifying device. Thereby, the exhaust gas comes to contact a whole area of the upstream-side end face of the exhaust-gas purifying device uniformly.

Meanwhile, the exhaust gas discharged from the rest of the plural independent exhaust pipes flows in the cylinder row direction and then flows into the collective pipe after flowing down through the guide pipe. Accordingly, this exhaust gas easily flows down in the collective pipe along the wall face of the collective pipe which is positioned on the above-described one end side in the cylinder row direction, differently from the exhaust gas discharged from the one of the plural independent exhaust pipe positioned on the one end side in the cylinder row direction. This exhaust gas joins the above-described exhaust gas which goes upward at the arc-shaped recess part as the swirl, so that this exhaust gas can be prevented from concentrating on a lower side of the L-shaped bent part, i.e., on a lower side of the upstream-side end face of the exhaust-gas purifying device.

As described above, according to the present exhaust device, the swirl of the exhaust gas is induced by the arc-shaped recess part in spite of the collective pipe being configured to extend downward from the one of the plural independent exhaust pipes positioned on the one end in the cylinder row direction, so that the exhaust gas easily contacts the whole area of the upstream-side end face of the exhaust-gas purifying device uniformly. Consequently, purifying of the exhaust gas by the exhaust-gas purifying device is efficiently attained.

In an embodiment of the present invention, a protrusion part which protrudes outward is provided at a wall face of the collective pipe which is positioned on the above-described one end side in the cylinder row direction so as to change a flow of the exhaust gas fling into the collective pipe from the guide pipe toward a central portion of the upstream-side end face of the exhaust-gas purifying device.

According to this embodiment, since the exhaust gas flowing into the collective pipe from the guide pipe is prevented from concentrating on the lower side of the upstream-side end face of the exhaust-gas purifying device, the exhaust gas easily contacts the whole area of the upstream-side end face of the exhaust-gas purifying device uniformly.

In another embodiment of the present invention, the guide pipe has a curved part which is configured to be curved in a protrusion direction of the one of the plural independent exhaust pipes protruding from the engine body and be continuous to the tip portion of the one of the plural independent exhaust pipes on the above-described one end side in the cylinder row direction.

According to this embodiment, when the exhaust gas flows into the collective pipe from the guide pipe, a flow direction of the exhaust gas is changed, by the curved part, from the cylinder row direction to a protrusion direction of the one of the plural independent exhaust pipes positioned on the above-described one end side. Thereby, the exhaust gas flowing into the collective pipe from the guide pipe easily flows down through the collective pipe along the wall face continuous to the tip potion of the one of the plural independent exhaust pipes positioned on the by the curved part one end side, similarly to the exhaust gas flowing into the collective pipe from the one of the plural independent exhaust pipes positioned on the by the curved part one end side. Accordingly, the swirl of the exhaust gas is easily induced by the arc-shaped recess part, so that the exhaust gas easily contacts the whole area of the upstream-side end face of the exhaust-gas purifying device uniformly.

In another embodiment of the present invention, an oxygen concertation detector is provided at a portion of the collective portion which is positioned below the protrusion part.

A portion of the collective pipe which is positioned below the protrusion part is an area where the exhaust gas flowing down along the wall face of the collective pipe positioned on the by the curved part one end side in the cylinder row direction and the exhaust gas swirling up by means of the arc-shaped recess part are mixed, where uniformization of the exhaust gas is high. According to this embodiment, since the oxygen concentration is detected at the portion below the protrusion part, the accuracy of the oxygen-concentration detection is improved.

In another embodiment of the present invention, the exhaust device further comprises a downstream-side exhaust-gas purifying device which is provided on the downstream side, in the exhaust-gas flowing direction, of the exhaust-gas purifying device, wherein the exhaust-gas purifying device and the downstream-side exhaust-gas purifying device are provided such that respective central axes thereof cross each other and a downstream portion of the exhaust-gas purifying device is configured to overlap a portion of an upstream-side end face of the downstream-side exhaust-gas purifying device, when viewed in an axial direction of the downstream-side exhaust-gas purifying device.

According to this embodiment, since the distance from the exhaust manifold to the downstream-side exhaust-gas purifying device can be shortened, the exhaust device can be made properly compact. Also, since the exhaust gas can be made to flow into the downstream-side exhaust-gas purifying device in a state where the temperature of the exhaust gas does not decrease very much, the exhaust-gas purifying performance can be properly secured.

Regarding the configuration of "respective central axes thereof cross each other," it is preferable that both central axes be substantially perpendicular to each other (that an angle between the both central axes be set at 80-100°.

Other features, aspects, and advantages of the present invention will become apparent from the following descriptions which refer to the accompanying drawings.

DETAILED DESCRIPTION OF THE INVENTION

Figure 1:
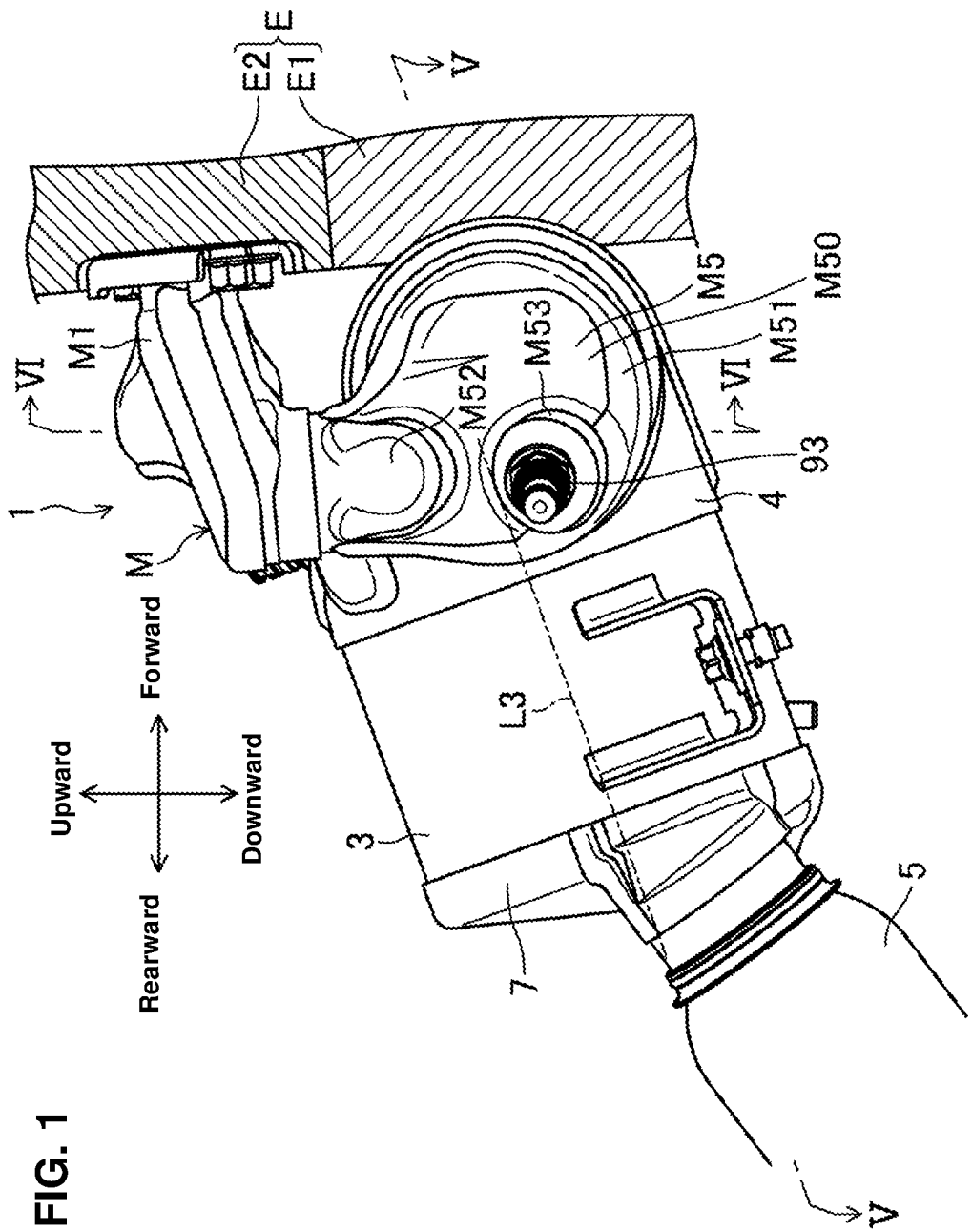
FIG. 1 is a side view of an exhaust device according to a first embodiment in a state where the exhaust device is attached to an engine body, when viewed from a rightward side.

Hereafter, embodiments of the present invention will be described specifically referring to the drawings. The following descriptions about the preferred embodiments exemplify the present invention substantially, which are not to limit applications or usages of the present invention at all.

Embodiment 1

<Engine>

An engine, to which an exhaust device 1 according to a first embodiment is applied, is an in-line four-cylinder gasoline engine (in-line multi-cylinder engine) which is installed to an automotive vehicle. The engine is disposed laterally at a front portion of a FF vehicle.

Herein, the present invention is applicable not only to this four-cylinder gasoline engine but to any other multi-cylinder engine or a diesel engine. Further, the present exhaust device 1 is applicable not only to the FF vehicle but to any other layout-type vehicles, such as a RR vehicle or a 4WD vehicle, including a motorcycle.

The engine has an engine body E which comprises a cylinder block E1 and a cylinder head E2 as shown in FIG. 1. While detailed illustrations are omitted here, first through fourth cylinders which are formed by the cylinder block E1 and the cylinder head E2 are arranged in line in a direction vertical to a paper surface. A combustion chamber of each cylinder is formed by a cylinder bore (not illustrated) of the cylinder block E1, a piston (not illustrated) which is arranged inside the cylinder bore, and the cylinder head E2.

Four exhaust ports (not illustrated) which are respectively connected to the four combustion chambers are formed at the cylinder head E2. Exhaust gas which is generated inside the combustion chambers is discharged to the outside of the vehicle through an exhaust path including these exhaust ports.

<Exhaust Path>

Figure 2:
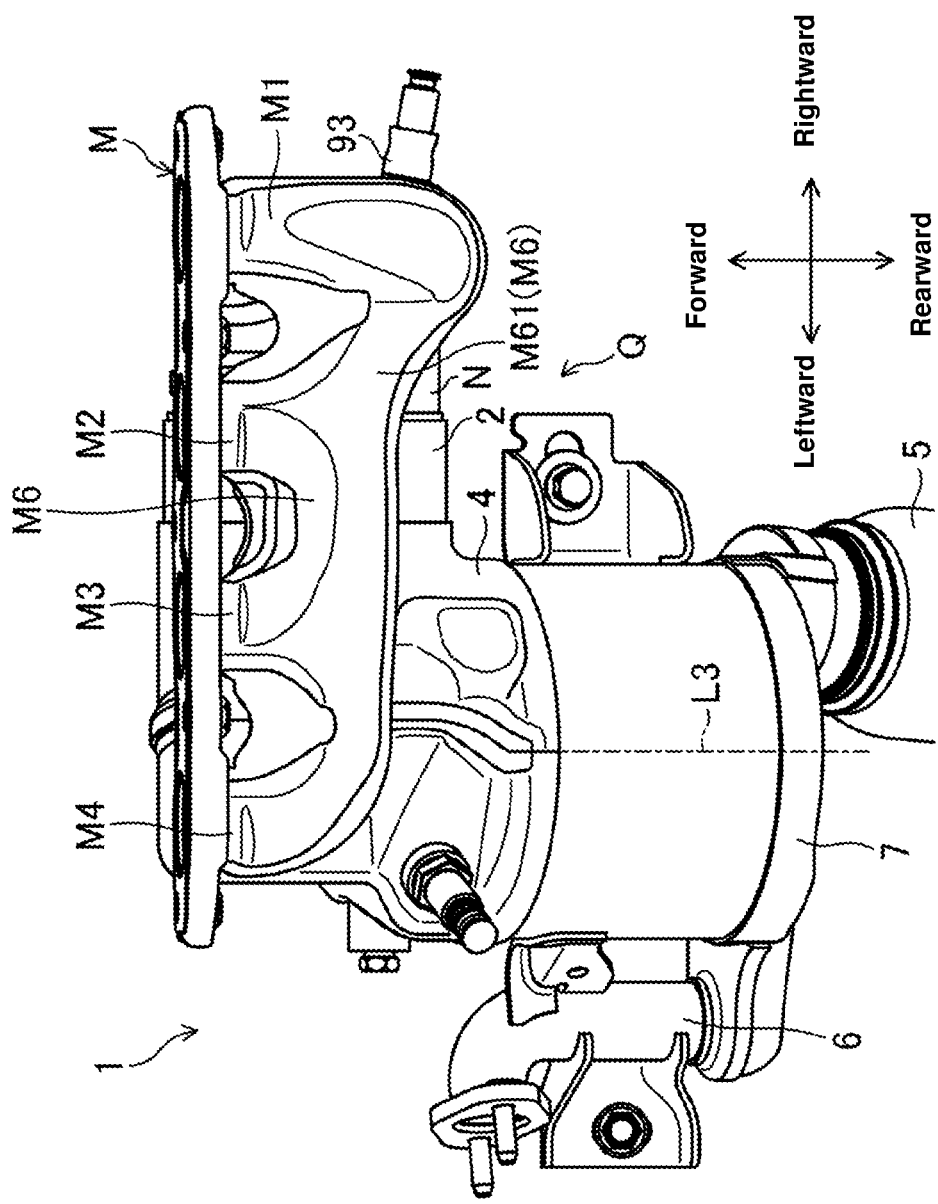
FIG. 2 is a plan view of the exhaust device shown in FIG. 1.

As shown in FIGS. 1 and 2, the exhaust device 1 according to the present embodiment is connected to the above-described exhaust ports, and a downstream-side exhaust system (not illustrated) which is continuous to the vehicle outside is connected to a downstream side of the exhaust device 1. Thus, an exhaust path of the engine comprises the above-described exhaust pipes, the exhaust device 1, and the downstream-side exhaust system.

<Exhaust Device>

The exhaust device 1 according to the present embodiment comprises, as shown in FIGS. 1-4, an exhaust manifold M which is connected to the four exhaust ports of the engine body E, an exhaust-gas purifying device Q which is connected to a downstream-end outlet M7 of the exhaust manifold M via a connection portion N, an exhaust-gas discharge pipe 5, and an EGR-gas takeout pipe 6.

Hereafter, respective structures will be described specifically. Herein, the structure of the exhaust manifold M will be described later.

<Direction>

A "vertical direction" and a "longitudinal direction" which are used in the present description are, as shown in FIG. 1, defined based on the directions where the cylinder head E2 is positioned at an upward side of the engine body E, the cylinder block E1 is positioned at a downward side of the engine body E, and the exhaust manifold M is positioned on a rearward side of the engine body E. Further, a "lateral direction" means, as shown in FIGS. 1 and 2, a direction of a cylinder row of the engine body E, in other words, a direction vertical to the paper surface of FIG. 1, where a near side means a leftward side and a far side means a rightward side. Moreover, an "upstream" and a "downstream" may mean respectively an "upstream side in the flowing direction of the exhaust-gas discharged from the combustion chamber through the exhaust port" and a "downstream side in the flowing direction of the exhaust-gas discharged from the combustion chamber through the exhaust port."

<Connection Portion>

The connection portion N is a pipe member for introducing the exhaust gas from the exhaust manifold M to an exhaust-gas purifying device Q.

<Exhaust-Gas Purifying Device>

The exhaust-gas purifying device Q comprises, as shown in FIGS. 2-5, a three-way catalyst 2 as an upstream-side exhaust-gas purifying device which is connected to the outlet of the connection portion N, a GPF (gasoline particulate filter) 3 as a downstream-side exhaust-gas purifying device which is arranged on the downward side of the three-way catalyst 2, and an L-shaped exhaust pipe 4 which interconnects the three-way catalyst 2 and the GPF 3.

<Three-Way Catalyst>

The three-way catalyst 2 is a catalyst for purifying hydrocarbon HC, carbon monoxide CO, and nitrogen oxide NOx in the exhaust gas. While specific descriptions are omitted here, the three-way catalyst 2 is made by coating a catalyst component which is formed by carrying noble metal, such as Pt, Pd or Rh, to a metal-oxide made support onto a honeycomb carrier. The three-way catalyst 2 is not to be limited to this in particular, but any known type is applicable.

Figure 4:
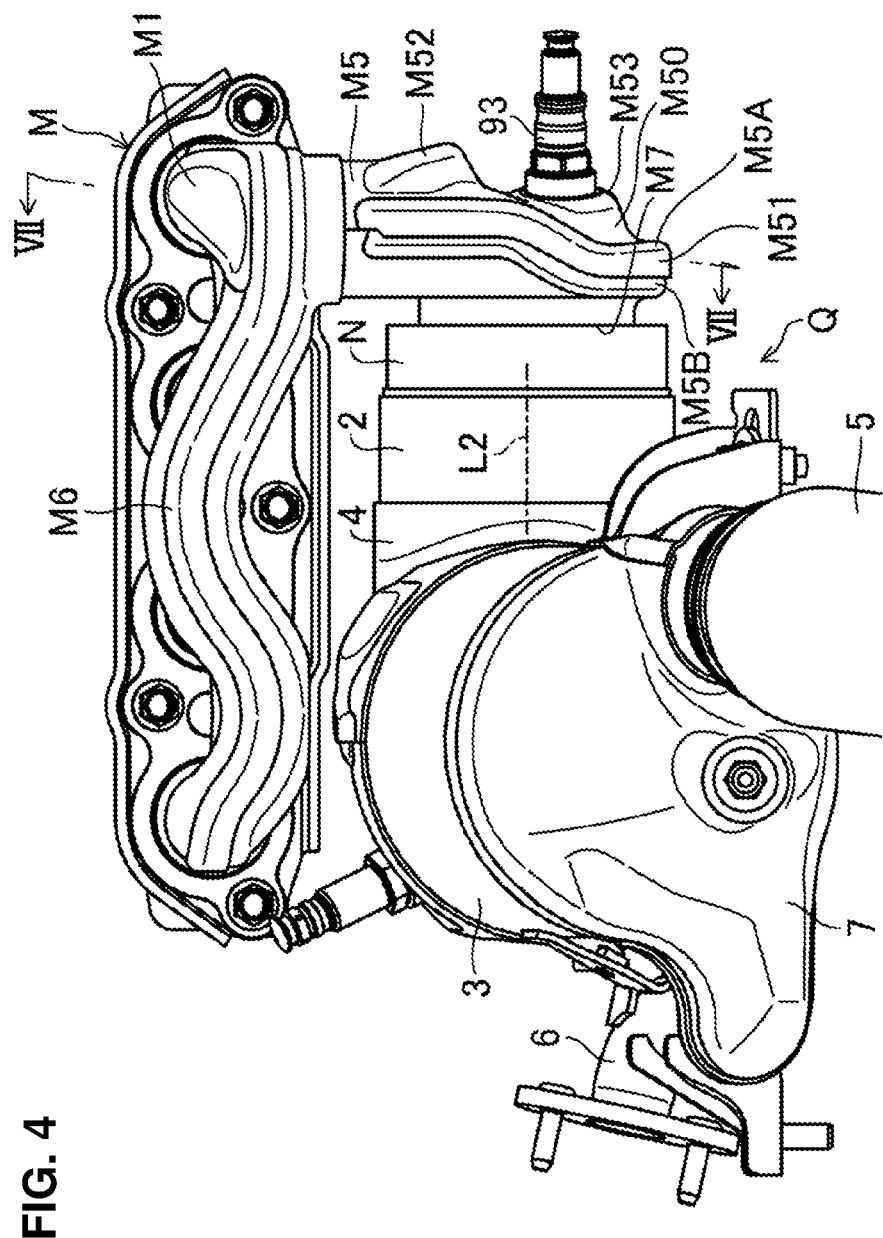
FIG. 4 is a back view of the exhaust device shown in FIG. 1.
Figure 5:
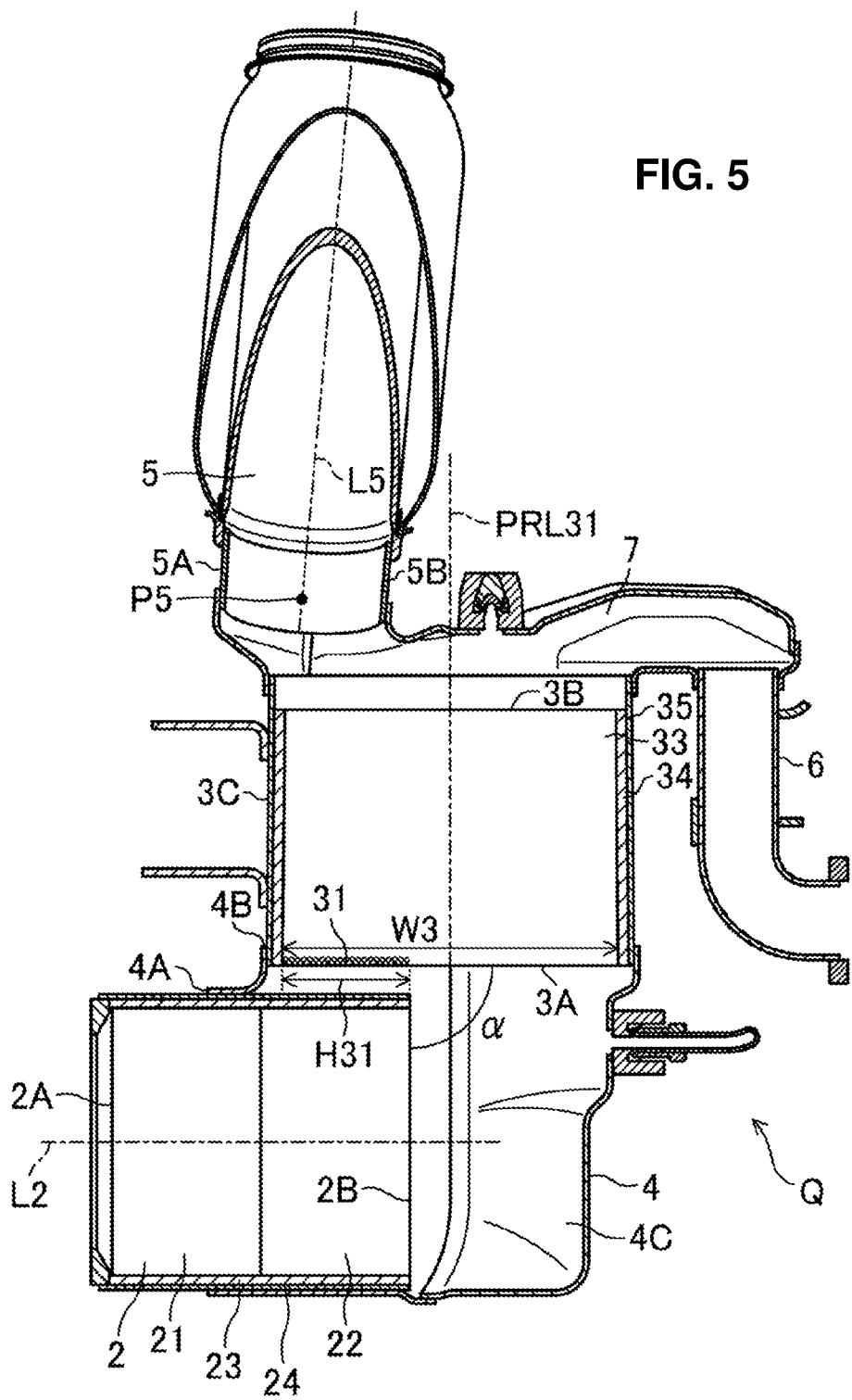
FIG. 5 is a sectional view taken along line V-V of FIG. 1.

As shown in FIGS. 4 and 5, the three-way catalyst 2 is a cylinder-shaped catalyst having a center axis L2. The shape of the three-way catalyst 2 is not limited in particular, but the cylindrical shape is preferable in arranging it in the exhaust path and providing uniform exhaust-gas flowing. A shape of a cross section of the three-way catalyst 2 which is vertical to the center axis L2 is not limited in particular, but any shape, such as a complete round shape, an oval shape, a rectangular shape, or a polygonal shape, is applicable. However, the complete round shape or the oval shape may be preferable in providing the uniform exhaust-gas flowing and reducing a manufacturing cost.

The three-way catalyst 2 is arranged such that the center axis L2 is parallel to the lateral direction (cylinder row direction) as shown in FIG. 4.

As shown in FIG. 5, a catalyst body of the three-way catalyst 2 which performs purification of the exhaust gas includes an upstream-side end face 2A and a downstream-side end face 2B. The upstream-side end face 2A of the catalyst body and the downstream-side end face 2B of the catalyst body will be sometimes referred to as the upstream-side end face 2A of the three-way catalyst 2 and the downstream-side end face 2B of the three-way catalyst 2 for convenience sake. The both end faces 2A, 2B are of a circular shape having the same diameter.

The three-way catalyst 2 has a two-step structure which comprises a front stage part 21 which is arranged on the upstream side and a rear stage part 22 which is arranged on the downstream side as the catalyst body. The front stage part 21 is a three-way catalyst which is excellent in low temperature activity for purifying the low-temperature exhaust gas during a low-load engine operation of the engine body E. The rear stage part 22 is a three-way catalyst which is excellent in high temperature activity for purifying the high-temperature exhaust gas during a high-load engine operation. While the catalyst 2 is the two-step structure comprising the front stage part 21 and the rear stage part 22 according to the present embodiment, any type of catalyst structure, such as single catalyst structure or a three or more split structure, is applicable.

Further, the three-way catalyst 2 comprises a mat 23 which covers over an outer periphery of the front stage part 21 and the rear stage part 22 as the catalyst body and a cylindrical case 24 which covers over an outer periphery of the mat 23.

The mat 23 stably holds the front stage part 21 and the rear stage part 22 as the catalyst body even under an environment where the catalyst body is exposed to the high-temperature exhaust gas, and this mat 23 is made of a material having highly heat resistant properties and heat retaining properties, such as ceramic.

The case 24 holds the catalyst body (the front stage part 21 and the rear stage part 22) and the mat 23, and this case 24 is made of metal, such as stainless steel or iron. Herein, any other known material can be applied for the mat 23 and the case 24.

<GPF>

As shown in FIG. 5, the GPF 3 is arranged on the downstream side of the three-way catalyst 2, which comprises a filter body (purifying device body) 33 for trapping particulate matters (hereafter, referred to as "PM") in the exhaust gas passing through the three-way catalyst 2. While specific descriptions are omitted here, the filter body 33 is made by applying sealing to the honeycomb carrier or the like and adding the filter performance, for example, or it may have a catalyst coat for promoting burning of the trapped PM. When the PM contained in the exhaust gas are trapped at a portioning wall of the filter 33 and the PM accumulates, a post injection in which fuel for increasing the temperature of the filter body 33 is injected into a combustion chamber in an expansion stroke of the engine is conducted after a main fuel injection in which fuel is injected into the combustion chamber for obtaining a power, for example, thereby burning and removing the PM accumulating at the filter body 33. The filter body 33 is not limited to the above-described structure, but any known structure is applicable.

As shown in FIGS. 1, 2 and 5, the filter body 33 is a cylinder-shaped member having a center axis L3. The shape of the filter body 33 is not limited in particular, but the cylindrical shape is preferable in easily arranging the filter body 33 in the exhaust path and providing uniform exhaust-gas flowing. A shape of a cross section of the filter body 33 which is vertical to the center axis L3 is not limited in particular, but any shape, such as a complete round shape, an oval shape, a rectangular shape, or a polygonal shape, is applicable. However, the complete round shape or the oval shape are preferable in providing the uniform exhaust-gas flowing and reducing a manufacturing cost.

Herein, as shown in FIG. 2, the GPF 3 is arranged such that the center axis L3 is positioned in the longitudinal direction, i.e., substantially in a direction vertical to the lateral direction (cylinder row direction).

As shown in FIG. 5, the filter body 33 of the GPF 3 comprises an upstream-side end face 3A and a downstream-side end face 3B. The upstream-side end face 3A of the filter body 33 and the downstream-side end face 3B of the filter body 33 will be sometimes referred to as the upstream-side end face 3A of the GPF 3 and the downstream-side end face 3B of the GPF 3 for convenience sake. The both end faces 3A, 3B are of a circular shape having the same diameter.

Similarly to the three-way catalyst 2, the GPF 3 comprises the filter body 33, a mat 34 which covers over an outer periphery of the filter body 33, and a tube-shaped case 35 which covers over an outer periphery of the mat 34. The mat 34 and the case 35 can be used for the similar purpose to the mat 23 and the case 24 of the above-described three-way catalyst 2 and have the similar structure to the mat 23 and the case 24.

<L-shaped Exhaust Pipe>

The L-shaped exhaust pipe 4 is a tube-shaped member which is formed in an L-shaped bent shape and connects the three-way catalyst 2 and the GPF 3, which forms a portion of the exhaust path.

As shown in FIG. 5, the L-shaped exhaust pipe 4 comprises an upstream-side opening 4A, a downstream-side opening 4B, and a bending portion 4C which is positioned between the both openings 4A, 4B.

As shown in FIG. 5, a downstream portion of the three-way catalyst 2 is inserted into the L-shaped exhaust pipe 4 through the upstream-side opening 4A. Meanwhile, an upstream end portion of the GPF 3 is inserted into the L-shaped exhaust pipe 4 through the downstream-side opening 4B.

The downstream-side end face 2B of the three-way catalyst 2 and the upstream-side end face 3A of the GPF 3 are provided such that a two-face angle α is about 90 degrees at the bending portion 4C. This two-face angle α is not limited to this angle, but in securing the exhaust-gas flowing from the three-way catalyst 2 to the GPF 3 sufficiently, an angle of 60-120 degrees is preferable, an angle of 70-110 degrees is more preferable, and an angle of 80-100 degrees is particularly preferable.

In addition, the three-way catalyst 2 and the GPF 3 are provided such that the downstream portion of the three-way catalyst 2 overlaps a portion of the upstream-side end face of the GPF 3, when viewed in the axial direction of the GPF 3. That is, an overlap portion 31 is formed at the three-way catalyst 2 and the GPF 3.

FIG. 5 is a sectional view taken along line V-V of FIG. 1, which shows a cross section which includes the center axis L2 of the three-way catalyst 2 and is parallel to the center axis L3 of the GPF 3, when viewed from the upward side. The cross section shown in FIG. 5 will be referred to as "V-V cross section" (cross section). As shown in FIG. 5, a length H31 of the side face of the three-way catalyst 2 which forms the overlap portion 31 relative to a whole length H2 of the three-say catalyst 2 is preferably 10 to 50% in the V-V cross section for arranging the tree-way catalyst 2 and the GPF 3 compactly and uniformizing the exhaust-gas flow inside the GPF 3.

Further, the length H31 of the side face of the three-way catalyst 2 relative to a width W3 of the GPF 3 is preferably 10 to 50% in the V-V cross section of FIG. 5 for arranging the tree-way catalyst 2 and the GPF 3 compactly and uniformizing the exhaust-gas flow inside the GPF 3.

Thus, by providing the overlap portion 31 of the three-way catalyst 2 and the GPF 3 in a case where the three-way catalyst 2 and the GPF 3 are arranged mutually in the lateral direction, the distance between a position below the exhaust manifold M and the GPF 3 can be made properly short. Further, by controlling (limiting) an area where the overlap portion 31 is provided within the above-described range, the exhaust device 1 can be properly compact and also a use (utilization) efficiency of the GPF 3, in particular a portion of the GPF 3 which is positioned behind the overlap portion 31, can be properly improved.

<Downstream-Side End Portion of GPF>

As shown in FIG. 5, to a downstream-side end portion 7 of the GPF 3 are attached the exhaust-gas discharge pipe 5 as an outlet of the exhaust gas passing through the GPF 3 and the EGR-gas takeout pipe 6 to recirculate a part of the exhaust gas toward an intake side as EGR gas.

<Exhaust-Gas Discharge Pipe>

The exhaust-gas discharge pipe 5 guides the exhaust gas passing through the GPF 3 to a downstream-side exhaust system, and reserves and drains water which is accompanied by the purification of the exhaust gas by means of the three-way catalyst 2 and the GPF 3.

A line denoted by a reference character PRL31 in FIG. 5 (a sectional view taken along line V-V of FIG. 1) is a projection line of the center axis L3 on the V-V cross section. Further, a line denoted by a reference character L5 shows a center axis of the exhaust-gas discharge pipe 5. A point denoted by a reference character P5 is the one on the center axis L5 of the exhaust-gas discharge pipe 5 and shows a center of an inlet of the exhaust-gas discharge pipe 5.

As shown in FIG. 5, the center position P5 of the exhaust-gas discharge pipe 5 is offset rightward, i.e., toward the three-way catalyst 2, from the projection line PRL31 of the center axis L3 of the GPF 3 on the V-V cross section. According to this structure, the exhaust gas flowing into the GPF 3 generates a gas flow flowing toward the exhaust-gas discharge pipe 5. Thereby, the amount of exhaust gas flowing down to the portion positioned behind the overlap portion 31 is increased. Thus, the use efficiency of the GPF 3 can be improved.

Herein, as shown in FIG. 5, the offset quantity of the exhaust-gas discharge pipe 5 can be preferably set so that a right-side face 5A of the exhaust-gas discharge pipe 5, which is positioned on the side of the three-way catalyst 2, is located on the rightward side, i.e., on the side of the three-way catalyst 2, of a GPF side face 3C of the GPF 3, which is positioned on the side of the three-way catalyst 2, on the V-V cross section from aspects of improving the use efficiency of the GPF 3 by sufficiently securing the amount of the exhaust gas flowing into the portion positioned behind the overlap portion 31. In this case, it is preferable, from aspects of suppressing an increase of flow resistance around the exhaust-gas discharge pipe 5, that the offset quantity of the exhaust-gas discharge pipe 5 be set so that a left-side face 5B of the exhaust-gas discharge pipe 5 which is positioned on the leftward side is located on the leftward side of the GPF side face 3C of the GPF 3 which is positioned on the side of the three-way catalyst 2 on the V-V cross section.

<EGR-Gas Takeout Pipe>

The EGR for circulating part of the exhaust gas toward the intake side is applied as a structure of the engine body E for the purpose of preventing an occurrence of nocking or reducing the amount of nitrogen oxide NOx. The EGR-gas takeout pipe 6 of the exhaust gas is connected to the downstream-side end portion of the GPF 3.

As shown in FIG. 5, the EGR-gas takeout pipe 6 is arranged on an opposite side to the exhaust-gas discharge pipe 5 relative to the projection line PRL31 on the V-V cross section, being spaced apart from the exhaust-gas discharge pipe 5. Thereby, the sufficient amount of exhaust gas can be secured for the EGR, and also the EGR-gas flow in the GPF 3 can be dispersed to the side of the exhaust-gas discharge pipe 5 and the side of the EGR-gas takeout pipe 6, thereby being uniformized Thus, the use efficiency, the function, and the performance of the GPF 3 can be further improved.

<Exhaust Manifold>

The exhaust gas discharged from the four combustion chambers of the engine through the exhaust ports is supplied to the exhaust-gas purifying device Q from the exhaust manifold M through the connection portion N.

As shown in FIG. 2, the exhaust manifold M comprises four independent exhaust pipes which are connected to respective exhaust ports of a first cylinder, a second cylinder, a third cylinder, and a four cylinder of the engine body E (not illustrated), i.e., a first independent exhaust pipe M1 (one of the plural independent exhaust pipes which is positioned on one end side in the cylinder row direction), a second independent exhaust pipe M2 (the rest of the plural independent exhaust pipes), a third independent exhaust pipe M3 (the rest of the plural independent exhaust pipes), and a fourth independent exhaust pipe M4 (the rest of the plural independent exhaust pipes).

Figure 3:
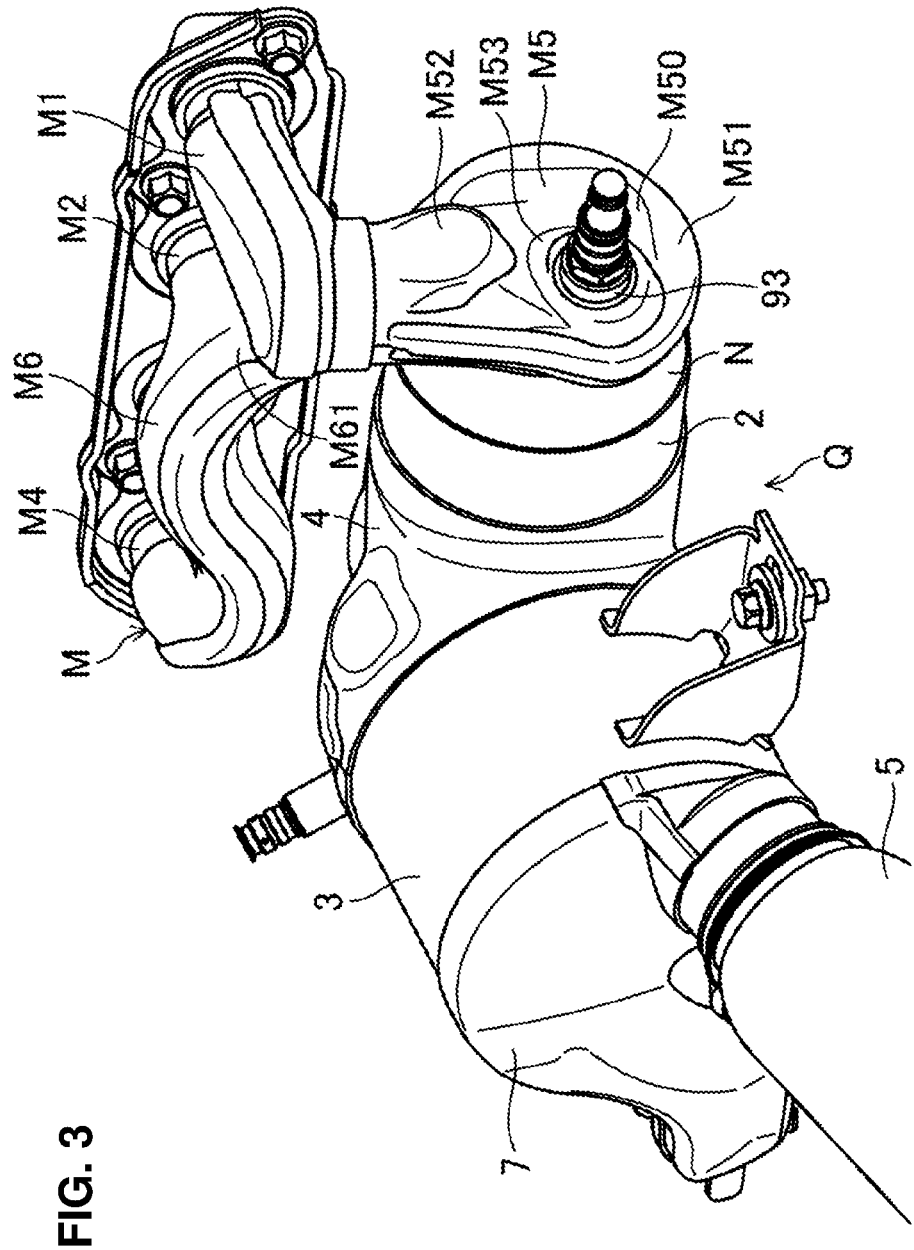
FIG. 3 is a perspective view of the exhaust device shown in FIG. 1, when viewed from an upper-right rearward side.

As shown in FIGS. 1, 3 and 4, the exhaust manifold M is provided on one end side, in the cylinder row direction, of the engine body, which comprises a collective pipe M5 which extends downward from a tip portion of the independent exhaust pipe M1 positioned on the one end side in the cylinder row direction.

The exhaust manifold M comprises a guide pipe M6 which extends in the cylinder row direction and guides the exhaust gas flowing from the independent exhaust pipes M2-M4 which corresponds to the rest of the plural independent exhaust pipes to the above-described independent exhaust pipe M1 positioned on the one end side in the cylinder row direction. The guide pipe M6 is connected to respective tip sides of the second independent exhaust pipe M2, the third independent exhaust pipe M3, and the fourth independent exhaust pipe M4, and also connected to a connection position of the first independent exhaust pipe M1 and the collective pipe M5.

Figure 6:
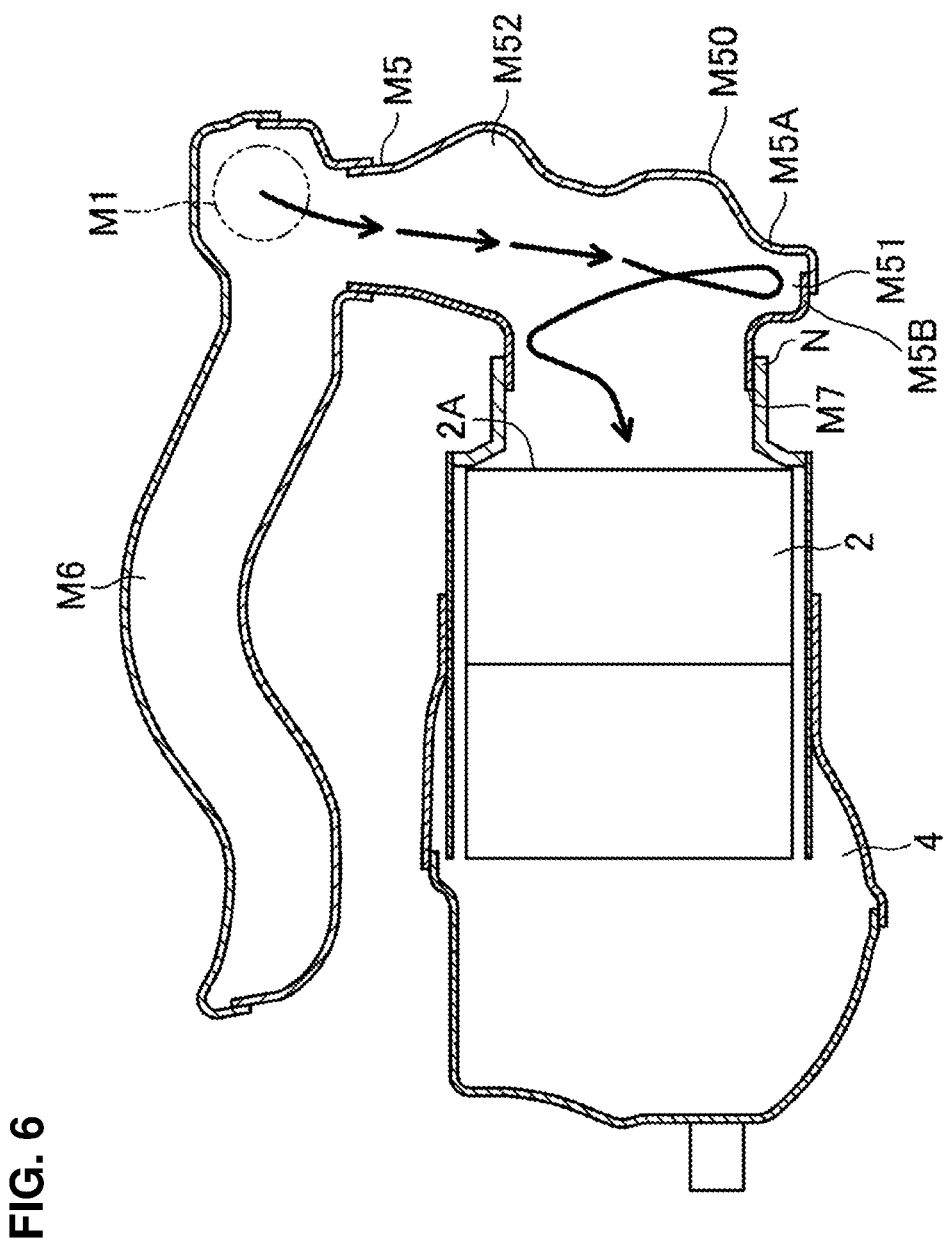
FIG. 6 is a sectional view taken along line VI-VI of FIG. 1.

An L-shaped bent part M50 which is configured to be bent in a lateral direction (leftward) in an L shape so as to direct the exhaust gas toward the upstream-side end face 2A of the three way catalyst 2 is provided at a lower portion of the collective pipe M5. As shown in FIG. 6, a downstream-side end outlet of the L-shaped bent part M50, i.e., the downstream-end outlet M7 is connected to the three-way catalyst 2 via the connection portion N. The downstream-end outlet M7 is of a circular shape, and an opening face of this outlet M7 is parallel to the upstream-side end face 2A of the three-way catalyst 2.

Figure 7:
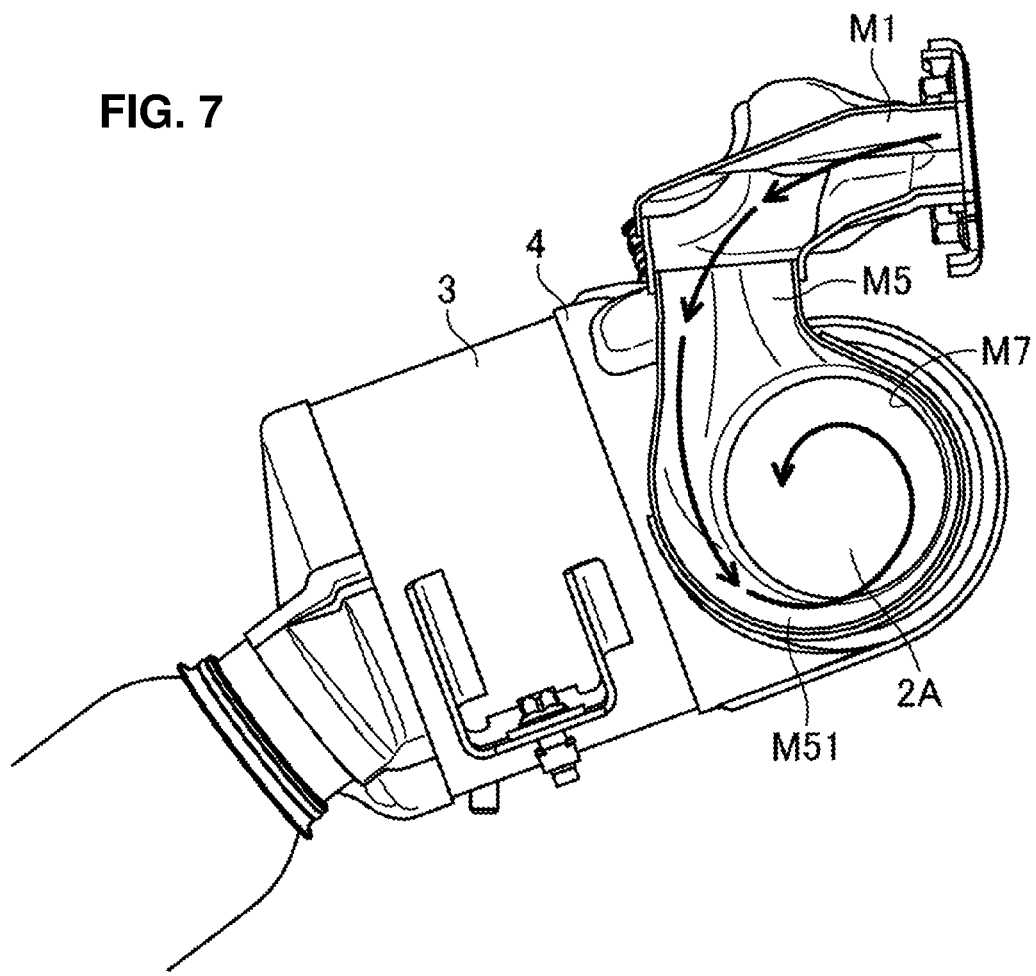
FIG. 7 is a sectional view taken along line VII-VII of FIG. 4.

As shown in FIGS. 6 and 7, an arc-shaped recess part M51 which has a larger radius than the downstream-end outlet M7 of the collective pipe M5 is provided at a lower-face side (lower-half peripheral side) of the L-shaped bent part M50 of the collective pipe M5.

Further, at a wall face of the collective pipe M5 which is positioned on the one end side in the cylinder row direction is provided a protrusion part M52 which protrudes outward so as to change the flow of the exhaust gas flowing into the collective pipe M5 from the guide pipe M6 toward a central portion of the upstream-side end face 2A of the three-way catalyst 2.

Herein, as shown in FIGS. 4, 6 and others, the collective pipe M5 is formed by fitting a right-side collective-pipe member M5A and a left-side collective-pipe member M5B, and the arc-shaped recess part M51 is formed at this fitting portion. The collective pipe M5 may be configured such that plural separate parts are combined or configured by a single integrated member.

<Regarding Functions of Arc-Shaped Recess Part and Protrusion Part>

Figure 10:
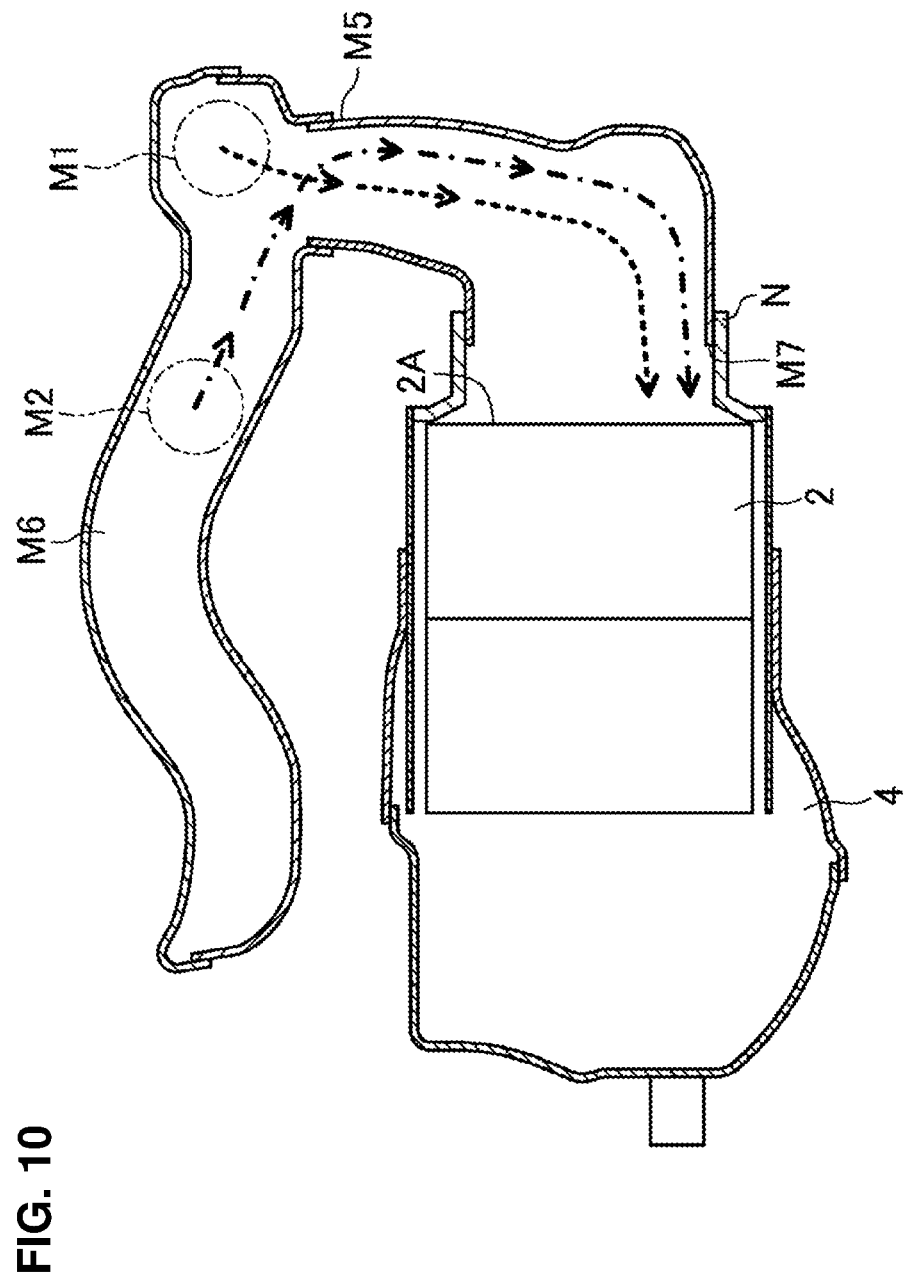
FIG. 10 is a sectional view of an exhaust device where an arc-shaped recess part and a protrusion part are not provided, which corresponds to FIG. 6.

FIG. 10 shows the exhaust-gas flow in a case where the above-described arc-shaped recess part M51 and the above-described protrusion part M52 are not provided.

It is generally known that the fluid, such as the exhaust gas, tends to flow along a curved surface having a large curvature radius. Accordingly, the exhaust gas discharged from the first independent exhaust pipe M1 positioned on the one end side in the cylinder row direction mainly flows down along the wall face of the collective pipe M5 which is continuous from the tip side of the first independent exhaust pipe M1 because of the inertia of the exhaust gas flowing toward the tip portion of the first independent exhaust pipe M1.

Then, as shown by broken-line arrows in FIG. 10, the exhaust gas reaches the L-shaped bent part M50 and changes its flowing direction toward the three-way catalyst 2, so that the exhaust gas easily contacts a lower-side portion of the upstream-side end face 2A of the three-way catalyst 2.

The exhaust gas discharged from the other independent exhaust pipe than the first independent exhaust pipe M1, for example, the second independent exhaust pipe M2, flows down, in the cylinder row direction, through the guide pipe M6, and flows into the collective pipe M5.

Accordingly, as shown by dashed-line arrows in FIG. 10, this exhaust gas mainly flows down through the collective pipe M5 along the wall face positioned on the one end side in the cylinder row direction. Thereby, this exhaust gas changes its flowing direction toward the three-way catalyst 2 at the L-shaped bent part M50 similarly to the exhaust-gas flow from the first independent exhaust pipe M1, so that this exhaust gas easily hits against the lower-side portion of the upstream-side end face 2A of the three-way catalyst 2. The exhaust gas discharged from the third or fourth independent exhaust pipes M3, M4 becomes a similar flow to the one discharged from the second independent exhaust pipe M2.

FIG. 6 shows an exhaust-gas flow inside the collective pipe M5 which has the arc-shaped recess part M51 and the protrusion part M52.

As shown by solid-line arrows in FIG. 6, the exhaust gas discharged from the first independent exhaust pipe M1 mainly flows down through the collective pipe M5 along the wall face continuous from the tip side of the first independent exhaust pipe M1 and reaches the L-shaped bent part M50.

At the lower-face side of this L-shaped bent part M50 is provided the arc-shaped recess part M51 having the larger radius than the downstream-end outlet (downstream-end outlet of the L-shaped bent part M50) M7 of the collective pipe M5. Accordingly, as shown by solid-line arrows in FIG. 7 as well, the exhaust gas having reached to the L-shaped bent part M50 flows upward along a recessed bottom wall face of the arc-shaped recess part M51 because of the inertia, and flows into the three-way catalyst 2, swirling around the axial center of the three-way catalyst 2. Thereby, the exhaust gas comes to contact a whole area of the upstream-side end face 2A of the three-way catalyst 2 uniformly.

Figure 8:
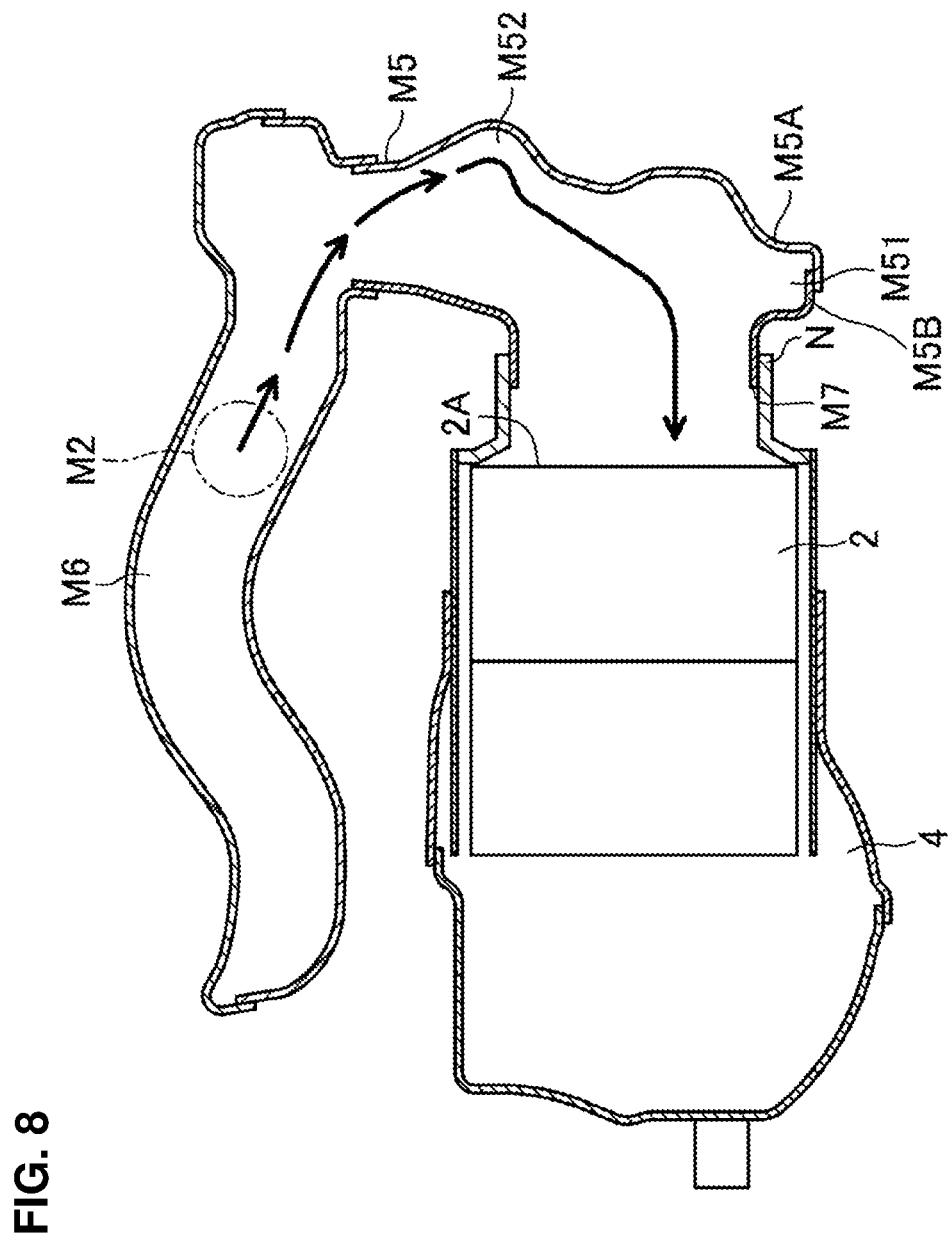
FIG. 8 is a sectional view schematically showing a state of an exhaust-gas flow from a second cylinder, which corresponds to FIG. 6.

The exhaust gas discharged from the second-fourth independent exhaust pipes M2-M4 flows down through the guide pipe M6 in the cylinder row direction and flow into the collective pipe M5 as shown by solid-line arrows in FIG. 8.

Accordingly, this exhaust gas mainly flows down through the collective pipe M5 along the wall face of the collective pipe M5 positioned on the one end side in the cylinder row direction because of the inertia, and reaches the wall face of the protrusion part M52. Then, this exhaust gas is guided by this wall face of the protrusion part M52 so that its flow direction is changed toward the center of the upstream-side end face 2A of the three-way catalyst 2. Thereby, the exhaust gas comes to contact the whole area of the upstream-side end face 2A of the three-way catalyst 2 uniformly.

<Regarding Curved Part of Guide Pipe>

As shown in FIGS. 2 and 3, the guide pipe M6 has a curved part M61 on the above-described one end side in the cylinder row direction. This curved part M61 is configured to be curved in the protrusion direction of the first independent exhaust pipe M1 protruding from the engine body and continuous to the tip portion of the first independent exhaust pipe M1.

Accordingly, when the exhaust gas discharged from the second—fourth independent exhaust pipes M2-M4 flows into the collective pipe M5 from the guide pipe M6, the exhaust-gas flow direction is changed, by the curved part M61, from the cylinder row direction substantially to the protrusion direction of the first independent exhaust pipe M1.

Thereby, the exhaust gas flowing into the collective pipe M5 from the guide pipe M6 easily flows down through the collective pipe M5 along the wall face continuous to the tip potion of the first independent exhaust pipe M1 positioned on the one end side, similarly to the exhaust gas flowing into the collective pipe M5 from the first independent exhaust pipe M1. Accordingly, the swirl of the exhaust gas is easily induced by the arc-shaped recess part M51, so that the exhaust gas easily contacts the whole area of the upstream-side end face 2A of the three-way catalyst 2 uniformly.

As described above, since the arc-shaped recess part M51, the protrusion part M52, and the curved part M61 make the exhaust gas contact the whole area of the upstream-side end face 2A of the three-way catalyst 2 uniformly, the whole part of the three-way catalyst 2 can be effectively used for purifying the exhaust gas, so that the exhaust-gas purification is promoted.

<Regarding Oxygen Sensor>

An seat portion for an oxygen sensor 53 is formed at a portion of the wall portion of the collective portion M5 which is provided to face the downstream-end outlet M7 and positioned below the protrusion part M52. An oxygen sensor 93 (an oxygen concentration detector) is provided at this seat portion M53 such that an oxygen-concentration detecting portion of the oxygen sensor 93 protrudes into an inside space of the L-shaped bent part M50.

A portion of the collective pipe M5 which is positioned below the protrusion part M5 is an area where the exhaust gas flowing down along the wall face of the collective pipe M5 positioned on the one end side in the cylinder row direction and the exhaust gas swirling up at the arc-shaped recess part M51 are mixed, where uniformization of the exhaust gas is high. According to this embodiment, since the oxygen concentration is detected at the portion below the protrusion part M52, the accuracy of the oxygen-concentration detection is improved.

Embodiment 2

Hereafter, a second embodiment of the present invention will be described specifically. Herein, in the following descriptions of the second embodiment, the same portions as the first embodiment are denoted by the same reference characters, specific descriptions of which are omitted here.

Figure 9:
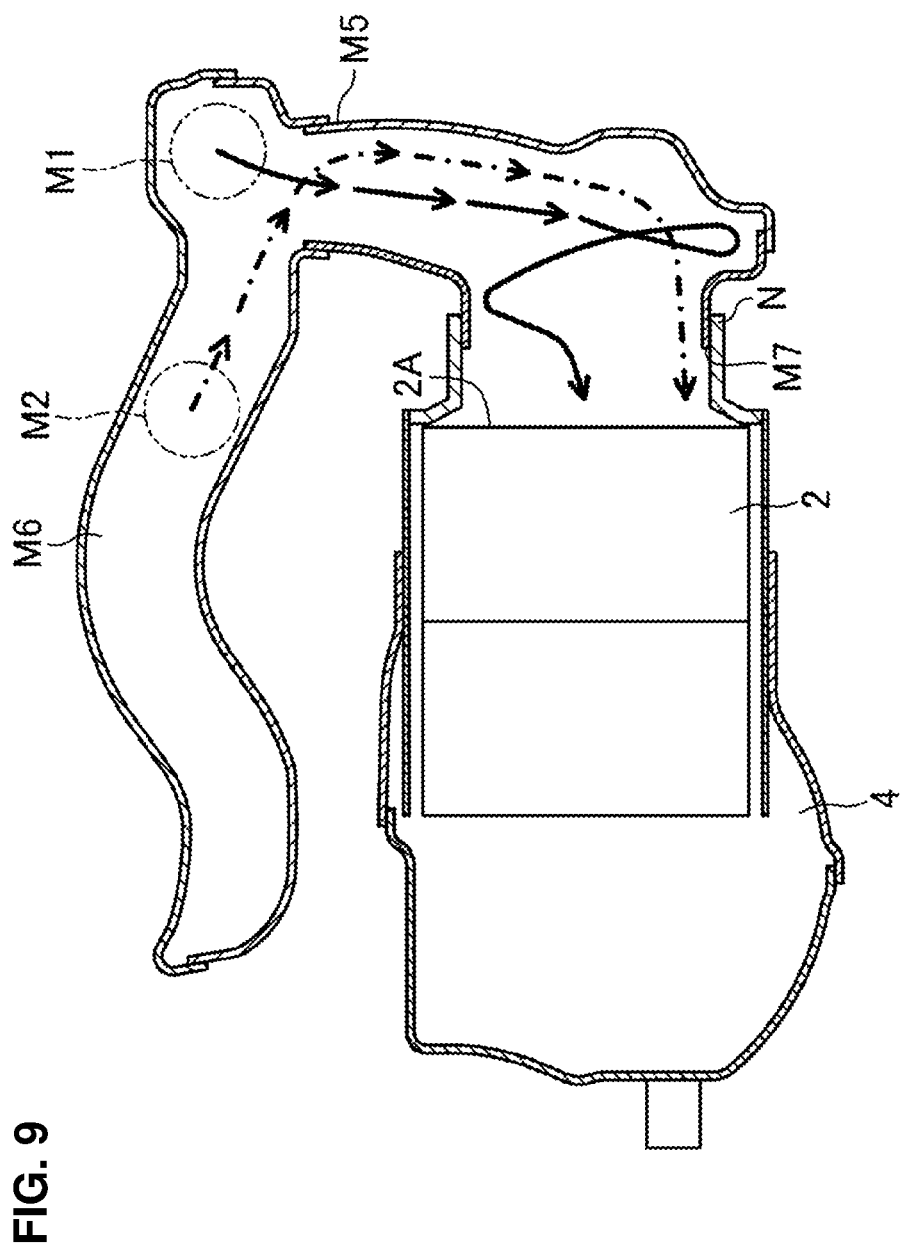
FIG. 9 is a sectional view of an exhaust device according to a second embodiment, which corresponds to FIG. 6.

While both the arc-shaped recess part M51 and the protrusion part M52 are provided at the collective portion M5 in the first embodiment, the wide part M51 may be provided only in the second embodiment as shown in FIG. 9. Since the collective pipe M5 does not have the protrusion part M52, its forming becomes easy.

In a case where the protrusion part M52 is not provided, the exhaust gas flowing into the collective pipe M5 from the guide pipe M6 flows down through the collective pipe M5 as shown by dashed-line arrows in FIG. 9. Herein, this exhaust gas joins the exhaust gas which flows down along the wall face of the collective pipe M5 which is continuous from the tip side of the first independent exhaust pipe M1 and swirls upward at the arc-shaped recess part M51, so that this exhaust gas can be prevented from concentrating on a lower side of the L-shaped bent part M50, i.e., on a lower side of the upstream-side end face 2A of the three-way catalyst 2.

In particular, in the second embodiment as well, when the exhaust gas flows into the collective pipe M5 from the guide pipe M6, the exhaust-gas flow direction is changed, by the curved part M61, from the cylinder row direction substantially to the protrusion direction of the first independent exhaust pipe M1 in a case where the curved part M61 is provided. Thereby, since the amount of the exhaust gas swirling upward at the arc-shaped recess part M51 increases, the exhaust gas can be prevented from concentrating on the lower side of the L-shaped bent part M50, i.e., on the lower side of the upstream-side end face 2A of the three-way catalyst 2 even in a case where the protrusion part M52 is not provided.

Other Embodiments

While the upstream-side exhaust-gas purifying device is the three-way catalyst 2 and the downstream-side exhaust-gas purifying device is the GPF 3 in the first and second embodiments, any other types of exhaust-gas purifying device are applicable. For example, in a case where the exhaust device 1 is applied to the diesel engine, a diesel particulate filter is useable in place of the GPF. Further, the upstream-side exhaust-gas purifying device may be an oxidation catalyst and the downstream-side exhaust-gas purifying device may be a NOx-purification catalyst, or its reverse is possible.

While the collective pipe M5 of the exhaust manifold M is arranged on the first-cylinder side in the first and second embodiments, the collective pipe M5 may be arranged on the fourth-cylinder side and the upstream-side end face 2A of the three-way catalyst 2 may be arranged on the left side.

<Evaluation of Gas Contacting with Three-Way Catalyst>

The analysis was performed based on the Computational Fluid Dynamics (CFD) model. A flow speed, a pressure, a temperature and others of the exhaust gas flowing into the three-way catalyst 2 were estimated based on the analysis results, and the uniformization of exhaust-gas contacting for each cylinder was evaluated as an improvement index of the exhaust gas contacting from an exhaust-gas flow distribution at the upstream-side end face 2A of the three-way catalyst 2. The results are shown in FIG. 11.

Herein, a comparative example 1 shows a sample where the arc-shaped recess part M51 and the protrusion part M52 are not provided as shown in FIG. 10, the first embodiment shows the one where both the wide part M51 and the step part M52 are provided as shown in FIG. 6, and the second embodiment shows the one where the wide part M51 is provided only as shown in FIG. 9.

Figure 11:
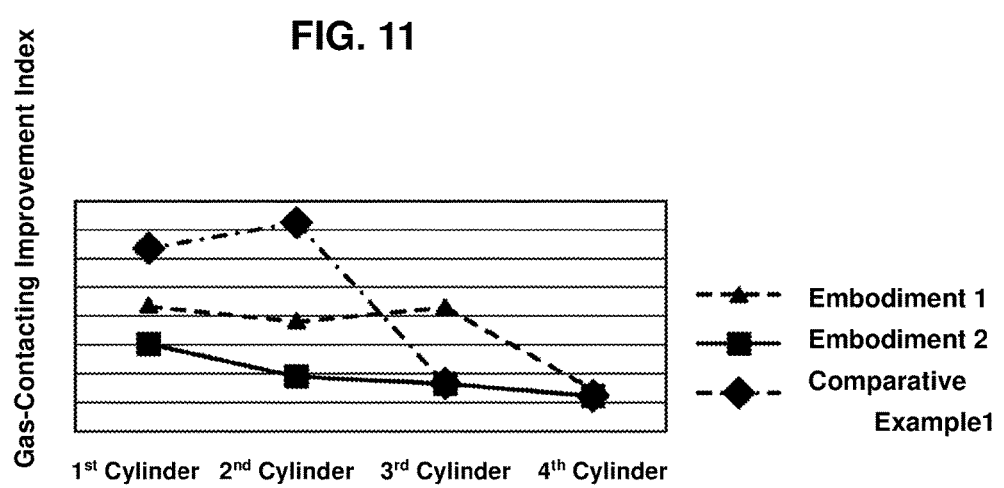
FIG. 11 is a graph showing improvement indexes of exhaust-gas flows from cylinders for the first embodiment, the second embodiment, and a comparative example.

As shown in FIG. 11, the uniformization of contacting of the exhaust gas from all of the cylinders regarding the first embodiment and the second embodiment were improved, compared to the comparative example 1.

Specifically, the exhaust-gas contacting improvement indexes for the first cylinder of the first embodiment and the second embodiment were improved by about 30% and about 50%, respectively, compared to the comparative example 1.

For the second cylinder, the exhaust-gas contacting improvement indexes of the first embodiment and the second embodiment were improved by about 50% and about 75%, respectively.

For the third cylinder, the exhaust-gas contacting improvement indexes of the first embodiment and the second embodiment were deteriorated by about 160% and substantially equal, respectively.

For the fourth cylinder, the exhaust-gas contacting improvement index of the first embodiment was substantially equal, and the exhaust-gas contacting improvement index of the second embodiment was improved by about 10%.

Further, differences between the respective maximums and the respective minimums of the exhaust-gas contacting improvement indexes regarding the first embodiment and the second embodiment were decreased by about 50% and about 70%, compared to the comparative example 1, so that the uniformization of contacting of the exhaust gas were properly improved.

As described above, while the uniformization of contacting of the exhaust gas was decreased for the third cylinder regarding the first embodiment, in particular, contacting of the exhaust gas from all of the cylinders with the upstream-side end face 2A of the three-way catalyst 2 was uniformized greatly.

The exhaust device of the present invention can improve the uniformization of the exhaust-gas contacting with the exhaust-gas purifying device, and is considerably useful accordingly.

What is claimed is:

1. An exhaust device of an engine, comprising:
    an exhaust manifold connected to plural exhaust ports of an in-line multi-cylinder engine comprising an engine body provided with plural cylinders;
    an exhaust-gas purifying device connected to a downstream side, in an exhaust-gas flowing direction, of the exhaust manifold,
    wherein said exhaust manifold comprises plural independent exhaust pipes which are connected to the plural exhaust ports of the engine body,
    a collective pipe which is provided on one end side, in a cylinder row direction, of the engine body and extends downward from a tip portion of one of the plural independent exhaust pipes which is positioned on said one end side in the cylinder row direction,
    a guide pipe which extends in the cylinder row direction so as to introduce exhaust gas flowing down through the rest of the plural independent exhaust pipes toward said one of the plural independent exhaust pipes and guide the exhaust gas to said collective pipe,
    an L-shaped bent part which is provided at a lower portion of said collective pipe and configured to be bent in an L shape in a lateral direction such that the exhaust gas is directed toward an upstream-side end face of said exhaust-gas purifying device, and
    an arc-shaped recess part which is provided on a lower-face side of said L-shaped bent part of the collective pipe and configured to have a larger radius than an outlet of the L-shaped bent part which opens toward the exhaust-gas purifying device so as to promote a swirl of the exhaust gas such that the exhaust gas flowing down through the collective pipe along a wall face which is configured to be continuous downward from a tip side of said one of the plural independent exhaust pipes of the collective pipe flows into the exhaust-gas purifying device, swirling around an axial center of said exhaust-gas purifying device.

2. The exhaust device of the engine of claim 1, wherein a protrusion part which protrudes outward is provided at a wall face of said collective pipe which is positioned on said one end side in the cylinder row direction so as to change a flow of the exhaust gas fling into the collective pipe from said guide pipe toward a central portion of the upstream-side end face of said exhaust-gas purifying device.

3. The exhaust device of the engine of claim 1, wherein said guide pipe has a curved part which is configured to be curved in a protrusion direction of said one of the plural independent exhaust pipes protruding from the engine body and be continuous to the tip portion of said one of the plural independent exhaust pipes on said one end side in the cylinder row direction.

4. The exhaust device of the engine of claim 2, wherein an oxygen concertation detector is provided at a portion of said collective portion which is positioned below said protrusion part.

5. The exhaust device of the engine of claim 1, further comprising a downstream-side exhaust-gas purifying device which is provided on the downstream side, in the exhaust-gas flowing direction, of said exhaust-gas purifying device, wherein the exhaust-gas purifying device and said downstream-side exhaust-gas purifying device are provided such that respective central axes thereof are substantially perpendicular to each other and a downstream portion of the exhaust-gas purifying device is configured to overlap a portion of an upstream-side end face of the downstream-side exhaust-gas purifying device, when viewed in an axial direction of the downstream-side exhaust-gas purifying device.

6. The exhaust device of the engine of claim 2, wherein said guide pipe has a curved part which is configured to be curved in a protrusion direction of said one of the plural independent exhaust pipes protruding from the engine body and be continuous to the tip portion of said one of the plural independent exhaust pipes on said one end side in the cylinder row direction.

7. The exhaust device of the engine of claim 6, wherein an oxygen concertation detector is provided at a portion of said collective portion which is positioned below said protrusion part.

8. The exhaust device of the engine of claim 7, further comprising a downstream-side exhaust-gas purifying device which is provided on the downstream side, in the exhaust-gas flowing direction, of said exhaust-gas purifying device, wherein the exhaust-gas purifying device and said downstream-side exhaust-gas purifying device are provided such that respective central axes thereof are substantially perpendicular to each other and a downstream portion of the exhaust-gas purifying device is configured to overlap a portion of an upstream-side end face of the downstream-side exhaust-gas purifying device, when viewed in an axial direction of the downstream-side exhaust-gas purifying device.

\* \* \* \* \*